United States Patent [19]
Schmerling

[11] 3,799,997
[45] Mar. 26, 1974

[54] PREPARATION OF ALKENYNES
[75] Inventor: Louis Schmerling, Riverside, Ill.
[73] Assignee: Universal Oil Products Company, Des Plaines, Ill.
[22] Filed: Nov. 8, 1971
[21] Appl. No.: 196,792

[52] U.S. Cl...... 260/654 D, 260/648 R, 260/658 C, 260/678
[51] Int. Cl............................................. C07c 21/22
[58] Field of Search........................ 260/654 D, 678

[56] References Cited
UNITED STATES PATENTS
2,561,516  7/1951  Ladd et al...................... 260/654 D Primary Examiner—Leon Zitver
Assistant Examiner—Joseph A. Boska
Attorney, Agent, or Firm—James R. Hoatson, Jr.; William H. Page, II; Raymond H. Nelson

[57] ABSTRACT

Compounds containing both an ethylenic and an acetylenic linkage may be prepared by dehydrochlorination of chloro-substituted unsaturated compounds such as alkenes or alkadienes.

9 Claims, No Drawings

PREPARATION OF ALKENYNES

This invention relates to a process for the preparation of alkenynes. More specifically the invention is concerned with the process for preparing chlorinated, or unchlorinated, conjugated compounds containing both an ethylenic linkage and an acetylenic linkage.

The products which are obtained by the process of the present invention which is hereinafter described in greater detail are useful compounds in the chemical field. For example, the chlorinated vinyl acetylenes in which the chlorine is attached to an acetylenic carbon atom are useful in preparing flame retardant plastics and rubber. Inasmuch as the use of synthetic materials such as plastics is increasing to a great extent in the modern world it is necessary that the synthetic materials possess certain desirable physical characteristics such as fire resistance, or flame retardancy, when utilized in certain instances where an exposure to the possibility of flame is present. Examples of places which may be subjected to excessive heat or the action of a flame will include architectural panels for construction work, wall plugs for electrical connections, soundproofing material in walls, ceilings, etc., cable and wire coatings, appliance housings, underhood automotive use, heater ducts, TV cabinets, car or airplane interior components, automotive seats, boat interiors or exteriors, cushions for various vehicle seats such as airplane or automobile or bus seats, paint, lacquer, varnishes, protective films, etc.

It is therefore an object of this invention to provide a process for preparing compounds which contain both an ethylenic linkage and acetylenic linkage.

A further object of this invention is to provide a process for the preparation of conjugated alkenynes by dehydrochlorinating certain compounds of a type hereinafter set forth in greater detail.

In one aspect an embodiment of this invention resides in a process for the preparation of a conjugated alkenyne which comprises dehydrochlorinating a compound which possesses the generic formula:

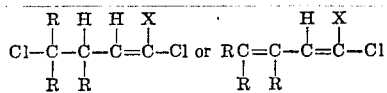

in which R is independently selected from the group consisting of hydrogen, alkyl or part of a cycloalkyl ring and X is independently selected from the group consisting of hydrogen, fluorine, chlorine, bromine, alkyl or cycloalkyl radicals, by treating said compound with an alcoholic solution of an alkaline compound at an elevated temperature, and recovering the resultant conjugated alkenyne.

A specific embodiment of this invention is found in a process for the preparation of 3-chloro-2-methyl-1-butene-3-yne which comprises dehydrochlorinating 1,1,4-trichloro-3-methyl-1-butene by treating said butene with an ethyl alcohol solution of potassium hydroxide at the reflux temperature of said solution, and recovering the resultant 4-chloro-2-methyl-1-butene-3-yne.

Other objects and embodiments will be found in the following further detailed description of the present invention.

As hereinbefore set forth the present invention is concerned with a process for preparing unsaturated compounds containing both an ethylenic linkage and an acetylenic linkage by dehydrochlorinating certain compounds of a type hereinafter set forth in greater detail. The starting materials for the process of this invention may be obtained by the free radical-induced condensation of olefins, cycloolefins, or bicycloolefins with polychloroolefins which are characterized by the presence of at least 1 chlorine atom on each of the doubly-bonded carbon atoms, at least 1 of which is also attached to a hydrogen atom. The presence of at least 1 chlorine atom on each of the doubly-bonded carbon atoms is a necessary prerequisite in order that the condensation product of the reaction between the polychloroolefins and the olefinic compound will result in the desired configuration necessary for the dehydrochlorination to prepare the desired product. Suitable polychloroolefins which may be utilized to form the desired starting material will include 1,2-dichloroethylene, trichloroethylene, 1,2-dichloropropene, 1,2-dichloro-1-butene, 1,2-dichloro-1-pentene, 1-fluoro-1,2-dichloroethylene, 1-bromo-1,2-dichloroethylene, 1,2-dichlorohexene, 1,2-dichloroheptene, 1,2-dichlorooctene, 1,2-dichlorononene, etc. containing at least 1 chlorine atom on each of the doubly-bonded carbon atoms, at least one of which is also attached to a hydrogen atom.

Examples of olefins, cycloolefins, and bicycloolefins which may be condensed with the aforementioned polychloroolefins may include ethylene, propylene, 1-butene, 2-butene, methylpropene, 1-pentene, 2-pentene, 1-hexene, 2-hexene, 3-hexene, 2,3-dimethylbutene, cyclopentene, cyclohexene, norbornene, etc.

The condensation of the aforementioned olefins and polychloroolefins is effected in the presence of a catalyst which is capable of forming free radicals under the conditions at which the reaction is effected. These include peroxy compounds containing bi-valent radical, -O-O-, and which are capable of inducing the condensation of the olefins with the polychloroolefins. The organic peroxy compounds constituted a preferred class of catalyst and include peracetic acid, persuccinic acid, dimethyl peroxide, diethyl peroxide, di-t-butyl peroxide, dipropyl peroxide, acetyl benzyl peroxide, acetyl peroxide, propionyl peroxide, butyryl peroxide, lauroyl peroxide, benzoyl peroxide, tetralin peroxide, urea peroxide, t-butyl perbenzoate, t-butyl hydroperoxide, etc. Other catalysts which may be used are the persulfates, perborates, and percarbonates of ammonium and the alkali metals, etc. as well as mixtures of the peroxy compounds. Only catalytic amounts, less than the stoichiometric amount, need be used to effect the condensation.

The reaction temperature which is employed to effect the condensation should be at least as high as the initial decomposition temperature of the free radical generating catalyst, such as a peroxide compound, in order to liberate and form free radicals which promote the reaction. However, the operating temperature generally does not exceed the decomposition temperature of the catalyst by more than about 150° C. In the continuous method of carrying out this process, the catalysts preferably are added continuously to the reaction zone, but, if desired, catalyst may be added intermittently, particularly when a packing material is used which retains the catalyst in the reaction zone. When a free radical generating catalyst such as tert-butyl perbenzoate is used, having a decomposition temperature of approximately 115° C., the operating temperature of the process is from about 115° C. to about 265° C. When a di-tert-butyl peroxide having a decomposition temperature of about 130° C. is used the process is run at a temperature of from about 130° C. to about 280° C. A temperature below 130° C. may be used, but the reaction time will need to be very long. Higher reaction temperatures may be employed, but little advantage is gained if the temperature is more than hereinbefore mentioned 150° C. higher than the decomposition temperature of the catalyst. The general effect of increasing the operating temperature is to accelerate the rate of the condensation reaction between the poly-halo-olefins and the ether. However, the increased rate of reaction is accompanied by certain amounts of decomposition. The preferred operating pressure of the process is that needed to keep a substantial portion of the reactants in a liquid phase and will generally range from atmospheric pressure to about 100 atmospheres or more.

Concentrations of the catalyst which are employed to effect the condensation of the olefin and polychloroolefin may also vary over a rather wide range, but is is desirable to use low concentrations of catalysts such as from about 0.1% to about 10% of the total weight of the olefin and the polychloroolefin. In addition the reaction time which is required to effect the condensation of the two compounds may be within the range of slightly less than 1 minute to several hours in duration. However, contact times of at least 10 minutes are usually preferred.

The compounds which form the starting materials for the process of this invention which are prepared according to the hereinbefore set forth process, will possess the generic formulae:

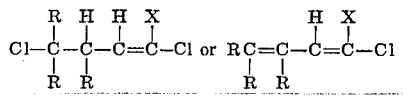

in which R is independently selected from the group consisting of hydrogen, alkyl or a part of a cycloalkyl ring and X is independently selected from the group consisting of hydrogen, fluorine, chlorine, bromine, alkyl or cycloalkyl radicals. Some representative examples of compounds possessing these formulae will include 1,4-dichloro-1-butene, 1,1,4-trichloro-1-butene, 1-fluoro-1,4-dichloro-1-butene, 1-bromo-1,4-dichloro-1-butene, 1-butene, 2-(2-chlorocyclopentyl)-1,1-dichloroethylene, 2-(2-chlorocyclohexyl)-1,1-dichloroethylene, 1-cyclohexyl-1,4-dichloro-1-butene, 1,4-dichloro-3-methyl-1-butene, 1,4-dichloro-3-ethyl-1-butene, 1,4-dichloro-3-propyl-1-butene, 1,4-dichloro-3-butyl-1-butene, 1,4-dichloro-3-pentyl-1-butene, 1,4-dichloro-3-hexyl-1-butene, 1,4-dichloro-3-cyclopentyl-1butene, 1,4-dichloro-3-cyclohexyl-1-butene, 1,1,4-trichloro-3-methyl-1-butene, 1,1,4-trichloro-3-ethyl-1-butene, 1,1,4-trichloro-3-butyl-1-butene, 1,1,4-trichloro-3-pentyl-1-butene, 1,1,4-trichloro-3-hexyl-1-butene, 1,4-dichloro-3-methyl-1-pentene, 1,4-dichloro-3-ethyl- 1-pentene, 1,4-dichloro-3-propyl-1-pentene, 1,4-dichloro-3-butyl-1-pentene, 1,4-dichloro-3-hexyl-1-pentene, 1,1,4-trichloro-3-methyl-1-pentene, 1,1,4-trichloro-3-ethyl-1-pentene, 1,1,4-trichloro-3-propyl-1-pentene, 1,1,4-trichloro-3-hexyl-1-pentene, 1,1,4-trichloro-3-methyl-1-hexene, 1,1,4-trichloro-3-ethyl-1-hexene, 1,1,4-trichloro-3-propyl-1-hexene, 1,1,4-trichloro-3-butyl-1-hexene, 1,-1,4-trichloro-3-hexyl-1-hexene, 1,1,4-trichloro-3,4-dimethyl-1-hexene, 1,1,4-trichloro-3-cyclopentyl-1-pentene, 1,1,4-trichloro-3-cyclohexyl-1-pentene, 1-chloro-1,3-butadiene, 1,1-dichloro-1,3-butadiene, 1-chloro-1-fluoro-1,3-butadiene, 1-bromo-1-chloro-1,3-butadiene, 1-chloro-3-methyl-1,3-butadiene, 1,1-dichloro-3-methyl-1,3-butadiene, 1-chloro-1-fluoro-3-methyl-1,3-butadiene, 1-chloro-1-bromo-3-methyl-1,3-butadiene, 1-chloro-1,3-pentadiene, 1,1-dichloro-1,3-pentadiene, 1-chloro-3-methyl-1,3-pentadine, 1-chloro-3-ethyl-1,3-pentadiene, 1-chloro-3-propyl-1,3-pentadiene, 1-chloro-3-hexyl-1,3-pentadiene, 1,1-dichloro-3-methyl-1,3-pentadiene, 1,1-dichloro-3-ethyl-1,3-pentadiene, 1,1-dichloro-3-propyl-1,3-pentadiene, 1,1-dichloro-3-butyl-1,3-pentadine, 1,1-dichloro-3-pentyl-1,3-pentadiene, 1,1-dichloro-3-hexyl-1,3-pentadiene, 1-chloro-3-cyclopentyl-1,3-butadiene, 1-chloro-3-cyclohexyl-1,3-butadiene, 1,1-dichloro-3-cyclopentyl-1,3-butadiene, 1,1-dichloro-3-cyclohexyl-1,3-butadiene, 1-chloro-1,3-hexadiene, 1,1-dichloro-1,3-hexadiene, 1-chloro-3-methyl-1,3-hexadiene, 1,1-dichloro-3-methyl-1,3-hexadiene, 1-chloro-3,4-dimethyl-1,3-pentadiene, 1-chloro-3,4-dimethyl-1,3-hexadiene, 1,1-dichloro-3,4-dimethyl-1,3-pentadine, 1,1-dichloro-3,4-dimethyl-1,3-hexadiene, 1-(2,2-dichlorovinyl)-1-cyclohexene, 1-(2,2-dichlorovinyl)-1-cyclopentene, 1-(2,2-dichlorovinyl)-1-cycloheptene. It is understood that the aforementioned compounds are only representative of the class of compounds which may be utilized as starting materials, and that the present invention is not necessarily limited thereto.

The aforementioned chloro and polychloro-substituted compounds are dehydrochlorinated by treatment with an alcoholic solution of an alkaline compound at dehydrohalogenation conditions. Examples of alkaline compounds will include compounds containing an alkali metal or an alkaline earth metal such as lithium hydroxide, potassium hydroxide, sodium hydroxide, rubidium hydroxide, cesium hydroxide, calcium hydroxide, magnesium hydroxide, strontium hydroxide, lithium carbonate, sodium carbonate, potassium carbonate, rubidium carbonate, cesium carbonate, magnesium carbonate, strontium carbonate, etc. Of the aforementioned alkaline compounds the preferred ones comprise potassium hydroxide and sodium hydroxide. Alkali-metal alkoxides and alkaline earth alkoxide such as potassium butoxide may also be used but not necessarily with equivalent results. Examples of alcohols which may be used as a medium in which the dehydrochlorination is effected will include methyl alcohol, ethyl alcohol, n-propyl alcohol, isopropyl alcohol, n-butyl alcohol, sec-butyl alcohol, t-butyl alcohol, m-amyl alcohol, sec-amyl alcohol, t-amyl alcohol, etc., the preferred alcohols comprising methyl alcohol, ethyl alcohol, and propyl alcohol due to their readily greater availability and lower boiling point. The dehydrochlorination reaction is effected at elevated temperatures ranging from about 65° up to about 150° C. or more, the preferred temperature being the refluxing temperature of the particular alcohol which is employed as the medium.

It is contemplated within the scope of this invention that the dehydrochlorination reaction may be effected in any suitable manner and may comprise either a batch or continuous type operation. For example, when a batch type operation is used a quantity of the chloro or polychloro-substituted olefin or conjugated diolefin of the type hereinbefore set forth in greater detail is placed in an appropriate apparatus provided with heating and reflux means, the alcoholic solution containing the alkaline compound is added and the mixture is then heated to the desired operating temperature. Upon completion of the desired residence time which may range from about 0.5 up to about 10 hours or more in duration, the reaction mixture is recovered, the mixture is then subjected to conventional means of separation and purification including extraction, washing, drying, fractional distillation, etc., whereby the dehydrochlorinated product comprising a conjugated alkenyne is recovered.

Another method of effecting the process of the present invention is by continuous manner of operation wherein the starting material is continuously charged to the reaction zone which is maintained at the proper operating conditions of temperature and pressure. The alcoholic solution containing the alkaline compound is also continuously charged to the reactor through a separate line, or if so desired, it may be admixed with the starting material and the resulting mixture charged to said reactor in a single stream. Upon completion of the desired residence time the reactor effluent is continuously withdrawn and subjected to conventional means of separation of the type hereinbefore set forth whereby the desired conjugated alkenyne is recovered while any unreacted starting material, alkaline compound and alcoholic solution are recycled to form a portion of the feed stock.

Some specific examples of conjugated alkenynes which may be obtained from utilizing the process of this invention will include 4-chloro-2-methyl-1-buten-3-yne, 4-chloro-2-ethyl-1-buten-3-yne, 4-chloro-2-propyl-1-buten-3-yne, 4-chloro-2-butyl-1-buten-3-yne, 4-chloro-2-pentyl-1-buten-3-yne, 4-chloro-2-hexyl-1-buten-3-yne, 5-chloro-3-methyl-2-penten-4-yne, 5-chloro-3-ethyl-2-penten-4-yne, 5-chloro-3-propyl-2-penten-4-yne, 5-chloro-3-butyl-2-penten-4-yne, 5-chloro-3-pentyl-2-penten-4-yne, 5-chloro-3-hexyl-2-penten-4-yne, 6-chloro-4-methyl-3-hexen-5-yne, 6-chloro-4-ethyl-3-hexen-5-yne, 6-chloro-4-propyl-3-hexen-5-yne, 6-chloro-4-hexyl-3-hexen-5-yne, 1-chloro-2-(1-cyclopentenyl)acetylene, 1-chloro-2-(1-cyclohexenyl) acetylene, 1-chloro-2-(1-cycloheptenyl) acetylene, etc. It is to be understood that the aforementioned compounds are only representative of the conjugated alkenynes which may be prepared according to the hereinbefore set forth processes and that the present invention is not necessarily limited thereto.

The following examples are given to illustrate the process of the present invention which, however, are not intended to limit the generally broad scope of the present invention in strict accordance therewith.

EXAMPLE I

In this example 50 g. (1.2 moles) of propene, 154 g. (1.2 moles) of trichloroethylene and 8 g. (0.06 moles) of di-t-butyl peroxide were placed in a glass liner of a rotating autoclave. The autoclave was sealed and nitrogen pressed in until an initial operating pressure of 30 atmospheres was reached. The autoclave and contents thereof was then heated to a temperature of 130° C. and maintained in a range of from 130° to 140° C. for a period of 4 hours; the maximum pressure at this temperature reached 61 atmospheres. At the end of 4 hours heating was discontinued and the autoclave was allowed to return to room temperature, the final pressure at room temperature being 30 atmospheres. The excess pressure was discharged, the autoclave was opened and the reaction product comprising a dark amber liquid was recovered. The desired product comprising 1,1,4-trichloro-3-methyl-1-butene was recovered.

A solution of 5 g. of 1,1,4-trichloro-3-methyl-1-butene prepared according to the process of the above paragraph and 8.5 g. of potassium hydroxide in 108 cc. of a 95% ethyl alcohol solution was heated under reflux (78° C) for a period of 30 minutes during which time there was a voluminous precipitation of potassium chloride. The mixture was filtered, an additional amount of ethyl alcohol was added to the filtrate and the solution was again heated under reflux for an additional period of 4 hours. During this time only a small amount of potassium chloride precipitated out. At the end of the 4 hour period the mixture was filtered and then distilled and the cut boiling point at 73° to 77° C. was recovered. An amber sediment settled out of this cut which was centrifuged off and the liquid product was subjected to analysis. The infra-red spectrum of the material separated by preparative gas-liquid chromatography showed bands at 1,380 cm$^{-1}$ (CH$_3$), 1,620 cm$^{-1}$ (C=C), 2,230 cm$^{-1}$ (C≡C), 3,120 cm$^{-1}$

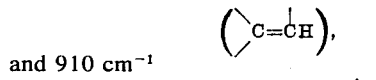

and 910 cm$^{-1}$

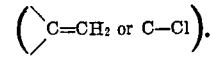

. Its mass spectrum showed loss of a methyl group and chlorine. The molecular ion peak at m/e 100 was significant. These spectral evidences disclose that the product was 4-chloro-2-methyl-1-buten-3-yne. It is of interest to note that the chloro compound was fairly stable despite the fact that a chlorine atom was attached to an acetylenic carbon atom. Chloroacetylene is self-inflammatory and spontaneously explosive.

EXAMPLE II

In a manner similar to that set forth in Example I above 59 g. (0.8 mole) of 2-pentene, 93 g. (0.7 mole) of trichloroethylene and 8 g. (0.6 mole) of di-t-butyl peroxide were placed in a glass liner of a rotating autoclave which was thereafter sealed. Nitrogen was pressed in until an initial operation pressure of 30 atmospheres was reached following which the autoclave was then heated to a temperature of 130° C. and maintained in a range of from 130° to 140° C. for a period of 4 hours. During this residence time the maximum pressure rose to 48 atmospheres. At the end of the 4 hour period heating was discontinued and the autoclave allowed to return to room temperature, the final pressure at room temperature being 30 atmospheres. The excess pressure was discharged, the autoclave was opened and the reaction product comprising a dark amber product with little or no hydrogen chloride present was recovered. The product was subjected to distillation whereby the desired product was separated from unreacted starting materials and bottoms, the desired product comprising a mixture of 1,1,4-trichloro-3-ethyl-1-pentene, and 1,1,4-trichloro-3-methyl-1-hexene.

A solution of 5 g. of the above 1,1,4-trichloro-3-ethyl-1-pentene and 1,1,4-trichloro-3-methyl-1-hexene along with 9 g. of potassium hydroxide and 100 cc. of a 95% ethyl alcohol solution was heated under reflux (about 78° C.) for a period of 4 hours during which time there was a voluminous precipitation of potassium chloride. The dehydrochlorination product and ethanol were distilled, washed with water and extracted with ether. The washed ether extract was dried with potassium carbonate and distilled to remove the ether. The residue was submitted for analysis. The infra-red spectrum of one of two isomers which were separated by preparative gas-liquid chromatography showed a band at 2,210 cm$^{-1}$ which is indicative of a carbon to carbon triple bond. There was no band in the -C=C- stretch region but a band at 850 cm$^{-1}$ was indicative of a tri-substituted ethylene. A band at 780 cm$^{-1}$ was believed to indicate an ethyl group. Symmetry about the C=C group would favor a more minor C=C stretch band. This evidence indicated that one of the desired products comprised 6-chloro-4-methyl-3-hexen-5-yne.

The second isomer was similar to the first except that its infra-red spectrum had a C=C band at 1,640 cm$^{-1}$ (minor in intensity) suggesting that the compound was 5-chloro-3-ethyl-2-penten-4-yne.

EXAMPLE III

A mixture comprising 98 g. (0.88 mole) of 1-octene, 89 g. (0.68 mole) of trichloroethylene and 15 g. (0.10 mole) of di-t-butyl peroxide was placed in the glass liner of a rotating autoclave. The autoclave was sealed and nitrogen pressed in until an initial operating pressure of 30 atmospheres was reached. The autoclave was then heated to a temperature of 130° and maintained in a range of from 130° to 140° C. for a period of 4 hours, the maximum pressure at this temperature being 49 atmospheres. At the end of the 4 hour period heating was discontinued and the autoclave allowed to return to room temperature, the final pressure at room temperature being 30 atmospheres. The excess pressure was discharged and the autoclave was opened. The product which comprised a dark amber liquid was subjected to fractional distillation and the cut boiling at 77° to 78° C. at 0.4 mm. pressure was recovered. The cut was analyzed with the following results.

Calculated for: C$_{10}$H$_{17}$Cl$_3$: C,49.30; H,6.98
Found: C,49.87; H,7.00

This cut comprised 1,1,4-trichloro-3-hexyl-1-butene.
A sample of the product obtained according to the above paragraph was dehydrochlorinated by heating the sample with 8.3 g. of potassium hydroxide in 100 cc. of 95% ethyl alcohol for a period of 4 hours, said reflux temperature being about 78° C. The clear product was filtered from the potassium chloride which precipitated out, washed with water and extracted with ether. The washed ether extract was dried over potassium carbonate and distilled. The product recovered by distillation was submitted to preparative gas-liquid chromatographic separation followed by infra-red analysis. The spectrum disclosed by infra-red analysis showed a band at 905 cm$^{-1}$ which indicated an ethylenic linkage and a band at 2,215 cm$^{-1}$ which showed an acetylenic linkage. In addition a band at 730 cm$^{-1}$ was indicative of an alkyl chain containing at least 4 methylene groups. This analysis indicated the presence of the desired compound, namely, 4-chloro-2-hexyl-1-buten-3-yne.

EXAMPLE IV

In this example a mixture comprising 50 g. (0.8 mole) of cyclohexene, 136 g. (1.0 mole) of trichloroethylene and 6 g. (0.04 mole) of di-t-butyl peroxide was placed in the glass liner of a rotating autoclave and treated in a similar manner to that hereinbefore set forth, that is, the autoclave was sealed, nitrogen pressed in until an initial operating pressure of 30 atmospheres was reached and thereafter the autoclave was heated to a temperature of 130° C. The autoclave and contents thereof was maintained in a range of from 130° to 140° C. for a period of 4 hours, during which time the maximum pressure rose to 49 atmospheres. At the end of the 4 hour period heating was discontinued, the autoclave was allowed to return to room temperature, the excess pressure of 30 atmospheres was discharged and the reaction product which comprised a dark amber liquid was recovered. The product was subjected to fractional distillation and the cut boiling at 70°–77° C. at 10.0 mm. pressure was recovered. This cut was analyzed with the following results:

Calculated for: C$_8$H$_{10}$Cl$_2$: C,54.26; H,5.69
Found: C,54.27; H,5.78

This cut comprised 1-(2,2-dichlorovinyl)-1-cyclohexene.

In like manner the aforementioned 1-(2,2-dichlorovinyl)-1-cyclohexene was heated at a reflux temperature of 78° C. with an ethyl alcohol solution of potassium hydroxide for a period of 4 hours during which time potassium chloride precipitated out. The precipitate was removed by filtration and the liquid product was subjected to purification means similar to those hereinbefore set forth, that is by washing with water and extraction with ether. The washed ether extract was dried over potassium carbonate and distilled to remove the ether. The residue was submitted to analysis which disclosed the presence of 1-chloro-2-(1-cyclohexenyl)acetylene.

EXAMPLE V

In like manner a solution comprising 70 g. (1.0 mole) of 1-pentene and 55.5 g. (0.5 mole) of 1,1-dichloropropene along with 15 g. (0.10 mole) of di-t-butyl peroxide is placed in a glass liner of a rotating autoclave. The autoclave is sealed and nitrogen pressed in until an initial operating pressure of 30 atmospheres is reached. The autoclave is then heated to a temperature of 130° C. and maintained in a range of from 130° to about 140° C. for a period of 4 hours, the maximum pressure during this residence time reaching about 50 atmospheres. At the end of the 4 hour residence time, heating is discontinued, the autoclave is allowed to return to room temperature, and the excess pressure which will drop back to 30 atmospheres is discharged. The autoclave is then opened and the reaction product is recovered therefrom. The product is subjected to fractional distillation and the cut comprising 1,4-dichloro-3-propyl-1-butene is recovered therefrom.

The dichloro-substituted heptene which is prepared according to the above paragraph is then subjected to a dehydrochlorination step by treating said compound with an ethyl alcohol solution of sodium hydroxide at a reflux temperature of about 78° C. for a period of 4 hours. The sodium chloride which precipitates out is filtered and the liquid product is subjected to purification means similar to that set forth in the above examples. Analysis of the product will disclose the presence of the desired compound 2-propyl-1-buten-3-yne.

I claim as my invention:

1. A process for the preparation of a conjugated alkenyne or chloroalkenyne which comprises dehydrochlorinating a compound which possesses the generic formulae:

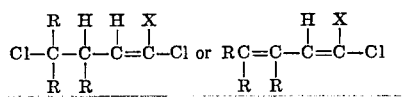

in which R is independently selected from the group consisting of hydrogen and alkyl and X is independently selected from the group consisting of hydrogen, fluorine, chlorine, bromine and alkyl, by treating said compound with an alcoholic solution of an alkaline compound at an elevated temperature, and recovering the resultant conjugated alkenyne.

2. The process as set forth in claim 1 in which said elevated temperature is the reflux temperature of the alcoholic medium.

3. The process as set forth in claim 1 in which said alkaline compound is sodium hydroxide.

4. The process as set forth in claim 1 in which said alkaline compound is potassium hydroxide.

5. The process as set forth in claim 1 in which said alcoholic solution is ethyl alcohol.

6. The process as set forth in claim 1 in which said compound is 1,1,4-trichloro-3-methyl-1-butene and said conjugated chloroalkenyne is 4-chloro-2-methyl-1-buten-3-yne.

7. The process as set forth in claim 1 in which said compound is 1,1,4-trichloro-3-hexyl-1-butene and said conjugated chloroalkenyne is 4-chloro-2-hexyl-1-buten-3-yne.

8. The process as set forth in claim 1 in which said compound is 1,4-dichloro-3-propyl-1-butene and said conjugated alkenyne is 2-propyl-1-buten-3-yne.

9. The process as set forth in claim 1 in which said compound is 1,1,4-trichloro-3-ethyl-1-pentene and said conjugated chloroalkenyne is 5-chloro-3-ethyl-2-penten-4-yne.

* * * * *